United States Patent
Gondi et al.

(10) Patent No.: US 7,656,939 B2
(45) Date of Patent: Feb. 2, 2010

(54) ADAPTIVE EQUALIZER WITH PASSIVE AND ACTIVE STAGES

(75) Inventors: Srikanth Gondi, Los Angeles, CA (US); Kouichi Abe, Mountain View, CA (US)

(73) Assignee: Kawasaki Microelectronics America, Inc., San Jose, CA (US)

( * ) Notice: Subject to any disclaimer, the term of this patent is extended or adjusted under 35 U.S.C. 154(b) by 578 days.

(21) Appl. No.: 11/236,833

(22) Filed: Sep. 28, 2005

(65) Prior Publication Data

US 2006/0088087 A1  Apr. 27, 2006

Related U.S. Application Data

(60) Provisional application No. 60/621,534, filed on Oct. 25, 2004.

(51) Int. Cl.
  *H03H 7/30* (2006.01)
  *H04B 3/04* (2006.01)
(52) U.S. Cl. ......................... 375/229; 333/18
(58) Field of Classification Search ......... 375/229–230, 375/257–258, 377; 333/18, 28 R
  See application file for complete search history.

(56) References Cited

U.S. PATENT DOCUMENTS

| | | | |
|---|---|---|---|
| 3,652,952 A * | 3/1972 | Chen | 330/286 |
| 3,824,501 A * | 7/1974 | Harris | 333/18 |
| 4,210,873 A * | 7/1980 | Suzuki et al. | 330/51 |
| 4,290,335 A * | 9/1981 | Sondermeyer | 381/98 |
| 4,300,164 A * | 11/1981 | Sacks | 348/251 |
| 4,303,896 A * | 12/1981 | Slabinski | 333/28 R |
| 4,999,522 A * | 3/1991 | Deville | 327/231 |
| 5,115,213 A * | 5/1992 | Eguchi | 333/18 |
| 5,274,339 A * | 12/1993 | Wideman et al. | 330/54 |
| 5,963,110 A * | 10/1999 | Ihara et al. | 333/28 R |
| 5,999,568 A * | 12/1999 | Yiu | 375/233 |
| 6,392,219 B1 * | 5/2002 | McCormick et al. | 250/214 R |
| 7,499,489 B1 * | 3/2009 | Ellersick et al. | 375/229 |

OTHER PUBLICATIONS

U.S. Appl. No. 11/214,918, filed Aug. 31, 2005, Gondi et al.
U.S. Appl. No. 11/214,910, filed Aug. 31, 2005, Gondi et al.
W. J. Dally, J. Poulton, "Transmitter Equalization for 4-Gbps Signaling," IEEE Micro, pp. 48-56, 1997.
H. Higashi, et al., "5-6.4 Gbps 12 channel Transceiver with Pre-emphasis and Equalizer," Symposium of VLSI Circuits Digest of Technical Papers, Jun. 2004, pp. 130-133.
A. J. Baker, "An Adaptive Cable Equalizer for Serial Digital Video Rates to 400Mb/s," International Solid-State Circuits Conference Digest of Technical Papers, pp. 174-175, Feb. 1996.

(Continued)

*Primary Examiner*—Khanh C Tran
(74) *Attorney, Agent, or Firm*—Oliff & Berridge, PLC

(57) ABSTRACT

An equalizer may use a passive input stage to improve linearity and reduce power consumption. In addition, the equalizer may use two gain circuits, one in a high frequency amplification path and the other in an all-pass path. The relative proportion of all-pass to high frequency amplification may be adjusted using a single control signal. The equalizer may provide 20 dB of peaking at 5 GHz with good linearity, using CMOS technology.

21 Claims, 7 Drawing Sheets

OTHER PUBLICATIONS

M. H. Shakiba, "A 2.5Gb/s Adaptive Cable Equalizer," International Solid-State Circuits Conference Digest of Technical Papers, pp. 396-397, Feb. 1999.

G. Zhang, et al., "A BiCMOS 10Gb/s Adaptive Cable Equalizer," International Solid-State Circuits Conference Digest of Technical Papers, pp. 482-483, Feb. 2004.

J. E. Jaussi, et al., "An 8Gb/s Source-Synchronous I/O Link with Adaptive Receiver Equalization, Offset Cancellation and Clock Deskew," International Solid-State Circuits Conference Digest of Technical Papers, pp. 246-247. Feb. 2004.

Y. Tomita, et al., "A 10Gb/s Receiver with Equalizer and On-chip ISI Monitor in 0.11 μm CMOS," Symposium on VLSI Circuits Digest of Technical Papers, pp. 202-205, Jun. 2004.

J.-S. Choi, et al., "A 0.18-μm CMOS 3.5-Gb/s Continuous-Time Adaptive Cable Equalizer Using Enhanced Low-Frequency Gain Control Method," IEEE J. Solid-State Circuits, vol. 39, No. 3, pp. 419-425, Mar. 2004.

E. Sackinger, W. C. Fischer, "A 3-GHz 32-dB CMOS Limiting Amplifier for SONET 0C-48 Receivers," IEEE J. Solid-State Circuits, vol. 35, No. 12, pp. 1884-1888, Dec. 2000.

R. Farjad-Rad, et al., "0.622-8.0Gbps 150mW Serial IO Macrocell with Fully Flexible Preemphasis and Equalization," Symposium on VLSI Circuits Digest of Technical Papers, pp. 63-66, Jun. 2003.

R. Sun, et al., "A Low-Power, 20-Gb/s Continuous-Time Adaptive Passive Equalizer," IEEE International Symposium on Circuits and Systems, pp. 920-923, May 2005.

Y. Kudoh, et al., "A 0.13-μm CMOS 5-Gb/s 10-m 28A WG Cable Transceiver With No-Feedback-Loop Continuous-Time Post-Equalizer," IEEE Journal of Solid-State Circuits, vol. 38, No. 5, pp. 741-746, May 2003.

G. Zhang, et al., "A BiCMOS 10Gb/s Adaptive Cable Equalizer," IEEE International Solid-State Circuits Conference, 26.7, 2004.

* cited by examiner

ADAPTIVE EQUALIZER WITH PASSIVE AND ACTIVE STAGES

RELATED APPLICATIONS

This non-provisional application claims the benefit of U.S. Provisional Application No. 60/621,534 filed Oct. 25, 2004, and is related to U.S. application Ser. No. 11/214,918 and U.S. application Ser. No. 11/214,910, each of which is incorporated by reference in its entirety.

BACKGROUND

This invention relates to systems and methods for improving the bandwidth in equalizers.

Data which is transmitted through a communications channel suffers from distortion due to the frequency-dependent transmission properties of the channel. Skin effect losses and dielectric losses are common examples of frequency-dependent channel losses which can be imposed on the signal passing through the channel. The distortion of the signal at high frequencies can lead to intersymbol interference (ISI), wherein the rising edge of a subsequent data bit is superimposed on the falling edge of the previous data bit, leading to a smearing of the transition between bits. This smearing causes increased timing jitter and reduced amplitude. The increased timing jitter makes clock recovery more difficult, whereas the reduced amplitude degrades the bit error rate performance of the channel at the output.

The frequency-dependent losses may, in theory, be compensated by applying either a precompensation to the signal at the input of the channel, or a frequency-dependent gain, or boost, to the signal at the output of the channel. Precompensation adjusts the attributes of the input signal at the transmitter to compensate for known transmission properties of the channel. However, since the transmission properties of the channel are often not known a priori, the compensation is more commonly applied to the output of the channel as receiver equalization, referred to herein as equalization.

Equalizers adjust the output signal from a channel to reverse some of the effect of distortion of the channel on the data signal. Equalizers apply a frequency-dependent amplification to the signal, such that frequencies which have been transmitted with high loss are amplified relative to frequencies which have been transmitted with low loss.

SUMMARY

However, at very high frequencies, the limited gain-bandwidth capability provided by the current technology limits the amount of boost that can be applied to a signal in a given frequency range. Equalizers in the multi-Gb/sec range have traditionally been implemented using expensive bipolar-CMOS technology. This makes high frequency equalizers very difficult to implement in cost-constrained, noisy environments, such as in microprocessors and memories on printed circuit boards (PCBs), backplane environments with a multitude of PCBs, server and networking equipment transferring data, and gigabit Ethernet applications.

A 10 Gb/sec equalizer may be fabricated using all CMOS processes. The equalizer may employ an input stage with passive components for an input boost stage, which may improve linearity and reduce power consumption. In addition, the equalizer may include two separate circuits, a high frequency amplification path and an all-pass path, which may adjust high frequency boosting independently of low frequency boosting. By adjusting bias current in two output amplifiers, a proportion of high frequency compared to low frequency boost may be selected.

The equalizer may therefore comprise at least one input boost stage including only passive components to determine a resistance x capacitance (RC) time constant of the input boost stage, and at least two gain stages disposed in parallel with each other, a high frequency gain stage amplifying high frequency components boosted by boost stages in the high frequency amplification path, and a low frequency gain stage amplifying components in the all-pass path.

Various details are described in, or are apparent from, the following detailed description.

BRIEF DESCRIPTION OF THE DRAWINGS

Various details are described with reference to the following figures, wherein.

DETAILED DESCRIPTION OF EXEMPLARY EMBODIMENTS

Figure 1:
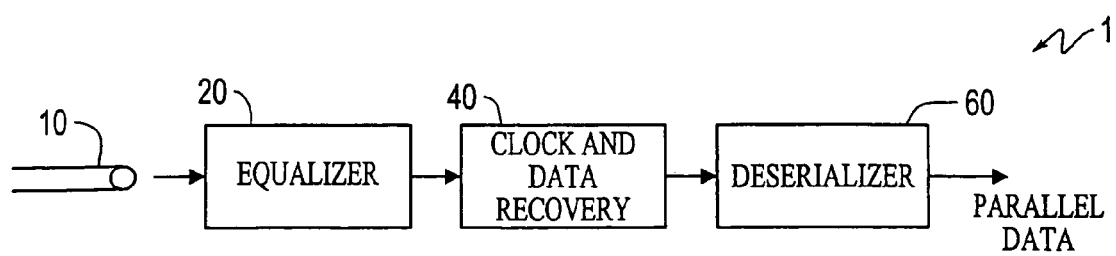
FIG. 1 is a diagram of an exemplary equalizer operating in a data detection circuit.

FIG. 1 is a diagram of an equalizer operating in a data detection circuit 1. Data may be transmitted over a channel 10, and the data signal may be distorted by the transmission characteristics of the channel. In particular, high frequency components, for example, frequencies in excess of 500 MHz, of the data signal may be attenuated, whereas low frequency components, for example, frequencies less than 500 MHz, may pass through the channel with relatively little loss. As a result, an equalizer 20 may be placed in the data detection circuit 1, to provide gain (boost) to the high frequency components. After the equalizer 20, a clock and data recovery circuit 30 may accept the equalized signal and recover a data clock based on the equalized signal. For example, a phase-locked loop may be employed to generate a clock based on zero-crossings of the equalized data signal. The equalized data signal may then be sampled according to the occurrence of the data clock pulses, and the samples may be compared to a threshold, to determine if a bit is present, and, when present, the digital value of the bit. The data may then be transmitted to a data deserializer 40, that may arrange the data in a parallel format and may output the parallel data on parallel lines.

Figure 2:
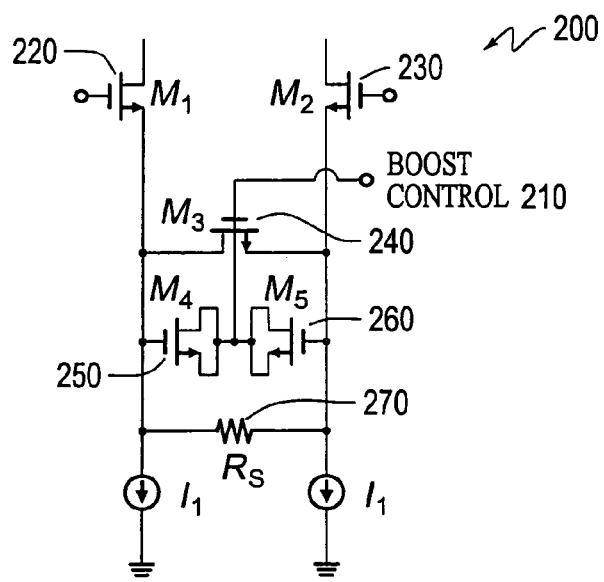
FIG. 2 is a diagram of an exemplary equalizer boost stage using active components.

FIG. 2 is a diagram of an exemplary equalizer boost stage 200 using active components. Differential input signals may be input to input transistors M1 220 and M2 230 on the input nodes shown. The response of the boost stage 200 to the input signal may be controlled by boost control line 210. By raising the voltage on boost control line 210, for example, the gate voltage on resistor M3 240 may be increased. This may decrease the resistance of transistor M3 240, so that M3 240 may act as a variable resistor. The boost control line 210 may then be connected to the drain terminals of M4 250 and M5 260 as shown in FIG. 2. By changing the voltage on the boost control line 210, the gate-to-drain voltage may be altered, thereby adjusting the capacitance of transistors M4 250 and M5 260. Therefore, changing the voltage of the boost control line 210 may effectively alter the resistance and capacitance in circuit 200. The values of R and C, along with an inductor (not shown), may determine the frequency characteristics of the circuit. Thus, the characteristics of the resonant response of the circuit may be tuned by changing the voltage on the boost control line 210.

Boost stages such as that shown in FIG. 2 have at least two distinct disadvantages: they dissipate power and they have limited linearity. The requirement that the equalizer be linear under maximum peaking conditions, i.e., for long trace lengths in the channel, may dictate the use of a passive resistor 270 in parallel with transistor M3 240. Therefore, the tuning range of the active boost stage 200 may be limited. Furthermore, because the boost stage 200 is, in general, followed by a gain stage (not shown), and the stages may be cascaded, a larger power supply may be required to generate a higher voltage needed to drive the cascaded stages.

Figure 3:
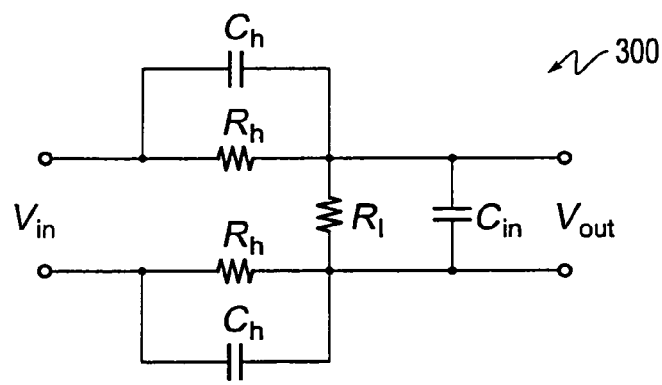
FIG. 3 is a diagram of an exemplary equalizer boost stage using passive components.

FIG. 3 is a diagram of an exemplary boost stage 300 made from passive components. The boost stage 300 may be an RC filter that may include two resistors $R_h$ and $R_L$ and two capacitors $C_h$ and $C_{in}$. The RC filter may be described by an RC time constant, wherein RC is a function of $R_L$, $R_h$, $C_h$ and $C_{in}$. At low frequencies, i.e. at frequencies $\ll 1/RC$ the capacitors may act as open circuits, so that the boost stage 300 may act as a voltage divider across resistors $R_L$ and $R_h$. Therefore, the output signal at low frequencies may be given by $$V_{out}/V_{in}=R_L/(R_h+R_L). \quad (1)$$

However, at high frequencies, i.e. at frequencies $\gg 1/RC$, the capacitors may control the output signal, according to $$V_{out}/V_{in}=C_h/(C_h+C_{in}). \quad (2)$$

Figure 4:
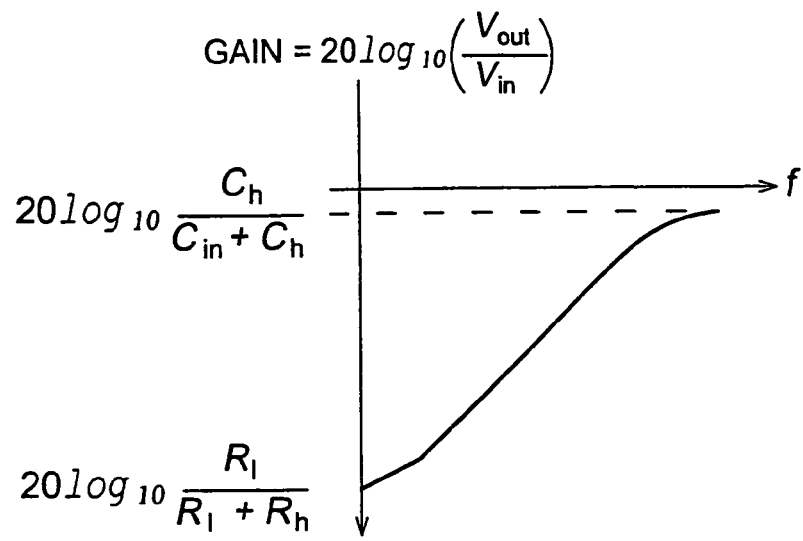
FIG. 4 is a diagram of the gain of the boost stage of FIG. 3.

Therefore, the shape of the gain curve for the passive circuit of FIG. 3 may be shown qualitatively as in FIG. 4. Boost stage 300 may act as a filter with a high frequency boost determined by equations (1) and (2), and a bandwidth determined by the RC time constant of the RC filter circuit.

Although the passive boost circuit of FIG. 3 is not tunable, it may have advantages in terms lower power dissipation and improved linearity performance, especially if this boost stage is used in the input, front-end of the equalizer 20 in FIG. 1.

Figure 5:
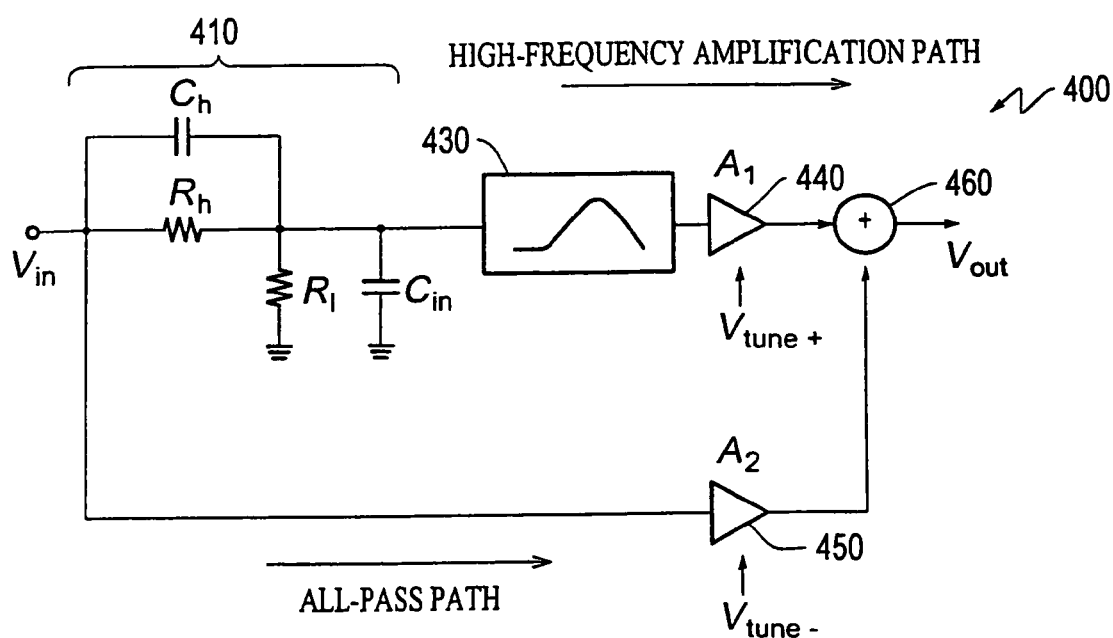
FIG. 5 shows an exemplary equalizer using a passive boost input stage and dual amplification.

FIG. 5 is a diagram of an exemplary equalizer 400 using a passive front end stage 410 to take advantage of its linear properties. The passive front end stage 410 may be followed by a boosting stage 430 and a gain stage 440 using active circuitry. The boosting stage 430 may be similar to that shown in FIG. 2. The combination of passive front end stage 410 with active boosting stage 430 and gain stage 440 may improve the performance of equalizer 400 over equalizers using only active components such as shown in FIG. 2.

Two amplifiers may be disposed in circuit 400. Amplifier 440 may amplify the high frequency components of the signal which were boosted by boost stage 430. Amplifier 450 may amplify all frequencies, for example, by tapping the signal before the passive front end stage 410. The outputs of the two amplifiers may be summed at adder 460. By adjusting the relative amount of gain applied by amplifier 450, relative to the gain applied by amplifier 440, the ratio of high frequency components to the overall signal may be adjusted.

Figure 8:
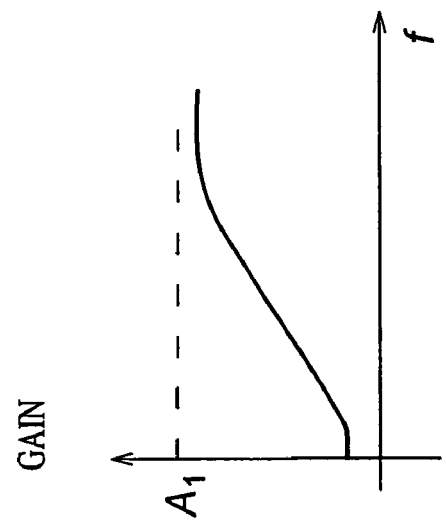
FIG. 8 shows the frequency response of the equalizer of FIG. 5 with high boost.
Figure 7:
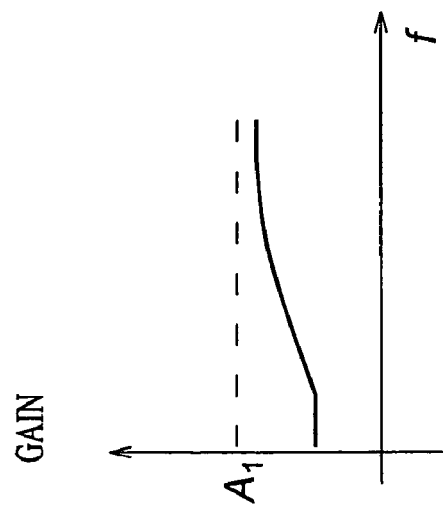
FIG. 7 shows the frequency response of the equalizer of FIG. 5 with intermediate boost.
Figure 6:
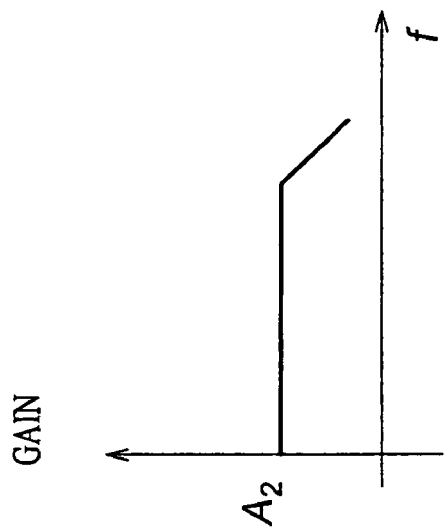
FIG. 6 shows the frequency response of the equalizer of FIG. 5 with no boost.

FIG. 6 shows qualitatively the performance of equalizer 400 using no boost, for example, by setting the amplification applied by gain stage 440 to zero. In this regime, the overall gain of the equalizer 400 may be determined solely by the amplification applied by amplifier 450, shown as level $A_2$ in FIG. 6. FIG. 7 shows the equalizer response in the intermediate regime, wherein boost stage 430 output is amplified to an intermediate level by amplifier 440, before being summed with the output of amplifier 450 at adder 460. Similarly, FIG. 8 shows the equalizer response in the high boost regime, wherein the gain applied by amplifier 440 is at a relatively high level.

Figure 9:
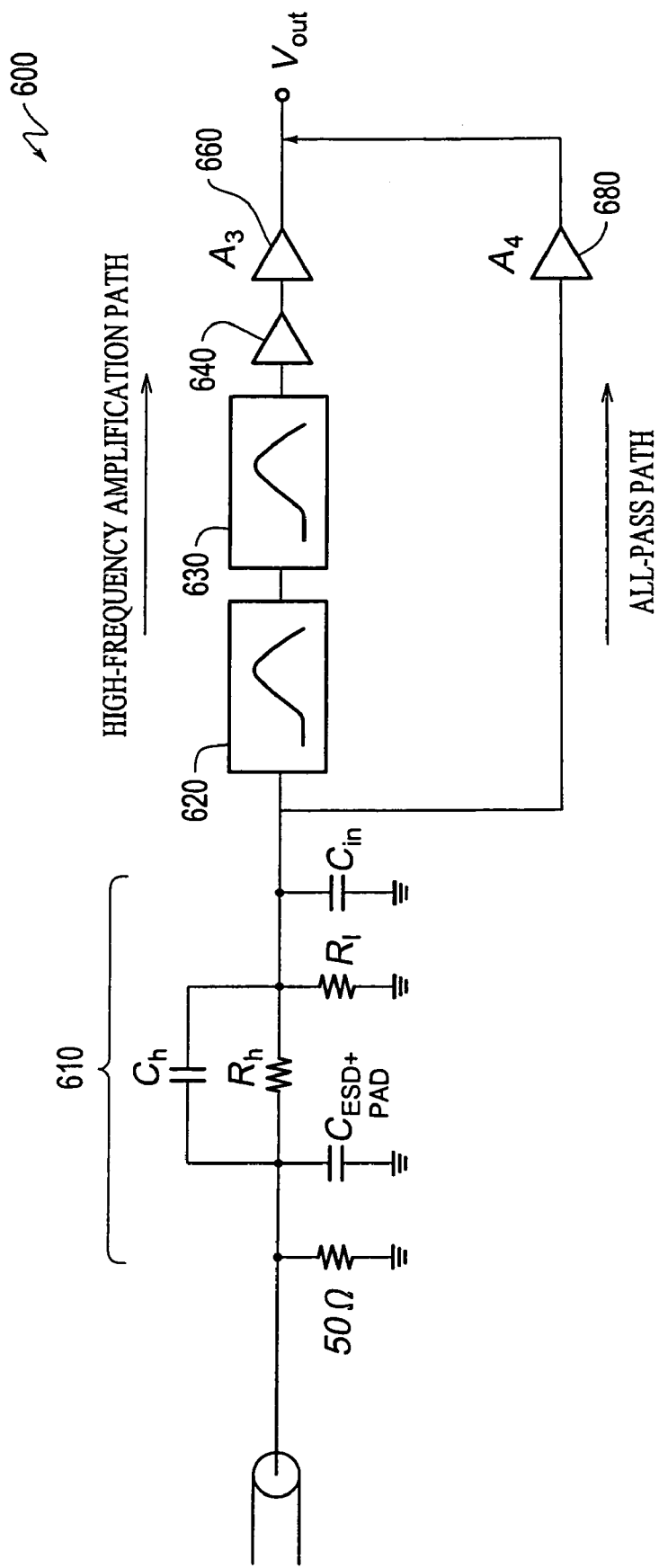
FIG. 9 shows another exemplary embodiment of an equalizer using a passive input stage.

FIG. 9 shows another exemplary equalizer 600 which includes a passive input stage 610. Passive input stage 610 may include other sources of input capacitances, such as $C_{ESD}$ which is the capacitance of electrostatic discharge structures, which are implemented to bleed off electrostatic charges which may inadvertently be applied to the circuit by, for example, handling. $C_{PAD}$ is additional parallel capacitance that may be disposed in the input pad of the structure. Resistors $R_h$, $R_L$, and capacitors $C_h$ and $C_L$ are the input capacitors and resistors whose values may be chosen according to the gain desired for the passive input structure according to equations (1) and (2). The gain circuit may be tapped after the passive input stage, as shown in FIG. 9, rather than before the passive input stage as shown in FIG. 5. This may improve the overall phase response of the circuit, because in the arrangement shown in FIG. 9, the all-pass path may have the same phase shift imparted by the passive input stage 610 as the high frequency amplification path. In the exemplary equalizer 400 shown in FIG. 5, the high frequency amplification path may have a phase shift imparted by the passive input stage which is not shared by the all-pass path.

Passive input stage 610 may be followed by two boost stages 620 and 630, using active components, which may be followed by gain stages 640 and 660. The path of the signal through boost stages 620 and 630, followed by gain stages 640 and 660, may be designated the high frequency amplification path, because the high frequency components of the signal are amplified by the boost stages 620, 630 and gain stages 640, 660. The path from passive input stage 610 through gain stage 680, may be designated the all-pass path. Both the high frequency amplification and all-pass paths may be joined at an output $V_{out}$ of the equalizer 600. The relative contribution of the all-pass path to the output signal $V_{out}$ compared to the contribution of the high frequency amplification path may be controlled by a first boost control signal, which controls the gain stage 660 relative to the gain of gain stage 680, controlled by a second boost control signal.

Figure 10:
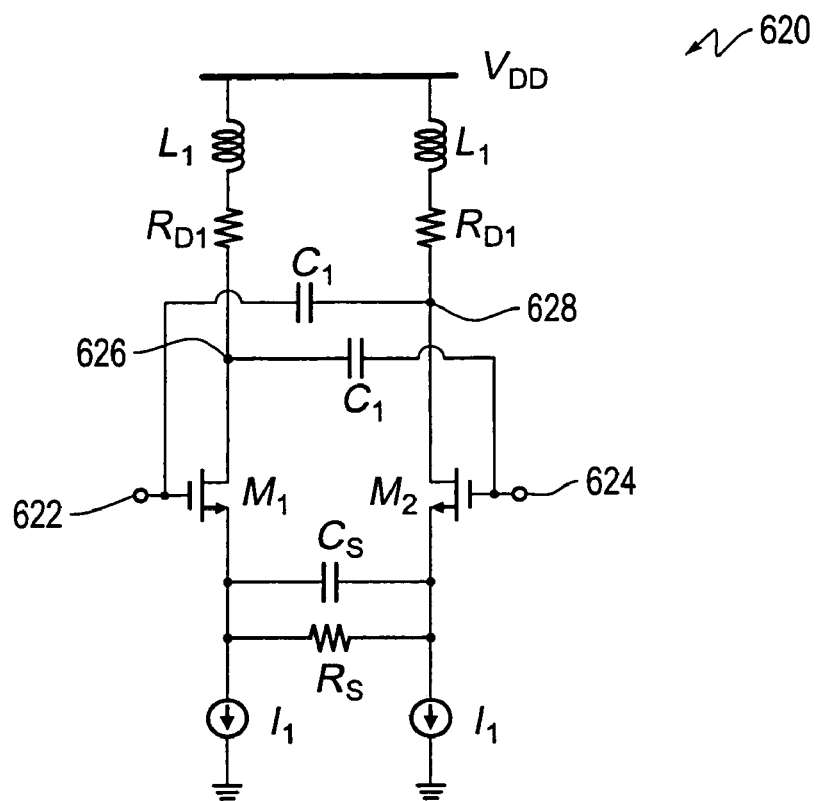
FIG. 10 shows further details of an exemplary boost stage of the equalizer of FIG. 9.

Additional detail of exemplary boost stage 620 is shown in FIG. 10. Boost stage 620 may have two input transistors M1 and M2 at differential input nodes 622 and 624. The boost stage 620 may also have a set of inductors $L_1$, a shunt capacitor $C_S$, and resistor $R_S$, which together may determine the frequency characteristics of the boost stage 620. For example, values of $\alpha_1=3$ nH, $R_{D1}=210$ ohms, $C_S=120$ fF and $R_S=800$ ohms may result in a resonant frequency of approximately 8 GHz. When the signal input on input nodes 622 and 624 is near the resonant frequency of the boost stage 620, the boost stage 620 may amplify the signal according to the degree of detuning of the signal frequency from the resonant frequency of the boost stage 620. Accordingly, the boost stage 620 may add some degree of peaking (boost) to the output signal which is taken from output nodes 626 and 628. This peaking, along with the negative capacitance provided by Cl, may enhance the bandwidth of the boost stage. The succeeding boost stage 630 may be constructed similarly to boost stage 620.

The high frequency boost of the boost stage 620 may be about 8 dB with a 10 GHz bandwidth, and with good linearity. However, the boost stage 620 may be lossy at low frequencies, as the low, non-resonant frequencies may be substantially attenuated by structure 620. Therefore, the effect of boost stage 620 is to boost frequency components in excess of about 500 MHz, while attenuating frequency components below about 500 MHz.

Figure 11:
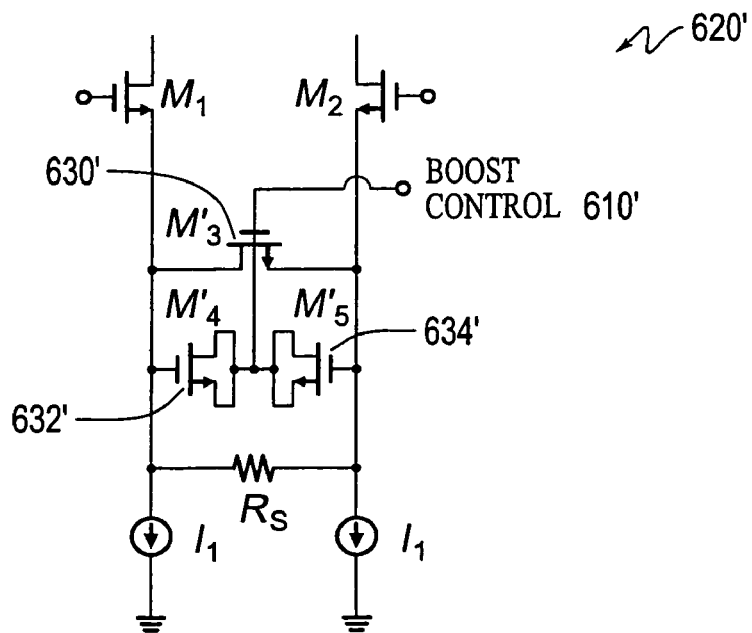
FIG. 11 shows further details of another exemplary boost stage usable with the equalizer of FIG. 9.

Although the frequency characteristics of the boost stage 620 shown are not tunable, it has the advantage of using relatively few transistors, only transistors M1 and M2, and therefore may be relatively easy to construct and may consume a relatively small amount of power. Furthermore, boost stage 620 may be more linear, and have less variation with process than boost stages using additional transistors, because boost stage 620 uses passive components $R_S$ and $C_S$, rather than active components. However, boost stage 620 may also be made tunable by replacing capacitor $C_S$ with a pair of transistors. An example of such a boost stage 620' is shown in FIG. 11. Boost control input 610' to boost stage 620' may control the tuning of the frequency characteristics of the boost stage 620' as follows. Transistor M3' 630' may operate as a variable resistor, because as the voltage on boost control input increases, the gate voltage on transistor M3' 630' increases, which increases the conductance (reduces the resistance) of the source to the drain of transistor M3' 630'. The boost control signal 610' may further be coupled to the sources and drains of transistors M4' 632' and M5' 634'. Thus, when the voltage on the boost control input 610' increases, the voltage between the sources/drains and gates of transistors M4' 632' and M5' 634' may increase, which may increase the capacitance between the gate and the drain/source of transistors M4' 632' and M5' 634'. Therefore, transistors M4' 632' and M5' 634' may function as varactors. Thus, depending on the voltage of the boost control input 610', the resistance of M3' 630' and capacitance of M4' 632' and M5' 634' may change, which, in combination with inductor $L_1$, may change the frequency characteristics of the boost stage 620'.

Using the boost stage 620' rather than boost stage 620 may require an additional boost control input signal, in addition to that supplied to gain stage 650, as described further below. Thus, using boost stage 620', there may be two adjustments available for determining the level of high frequency boost: one in the boost control input signal at boost control input 610' shown in FIG. 11, which may control the frequency characteristics of the boost stage 620', and the other is the second boost control signal, discussed in greater detail below with respect to FIG. 13.

Figure 12:
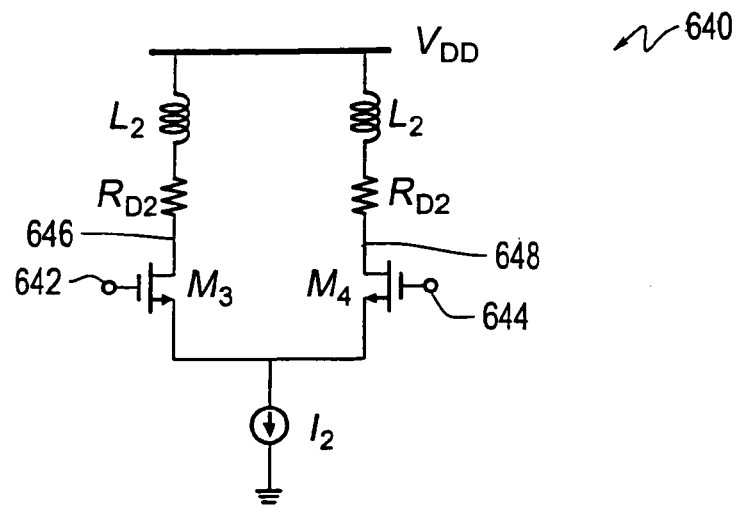
FIG. 12 shows further details of an exemplary gain stage of the equalizer shown in FIG. 9

Gain stage 640 is shown in further detail in FIG. 12. The signal output from nodes 626 and 628 in FIG. 10 may be input to input transistors M3 and M4 via input nodes 642 and 644. The input nodes 642, 644 may be the gate terminals of transistors M3 and M4. As the differential signal between 642 and 644 increases, the difference in gate voltage between M3 and M4 increases, such that the conductance of transistors M3 and M4 varies according to the gate voltages. As the gate voltage on input node 642, for example, increases, the conductance of transistor M3 may increase, such that the output node 646 may be pulled toward ground. Accordingly, the differential output of nodes 646 and 648 may be an inverted, amplified version of the differential input signal to nodes 642 and 644. Because there is no capacitor in amplifier stage 640, the gain applied to the output signal may be frequency-independent, such that all of the frequency dependent gain may be applied by the boost stage 620, and the gain stage 640 may simply apply amplification to all components of the input signal. However, it should be understood from FIG. 12, that the swing of the output signal from output nodes 646 and 648 cannot exceed the supply voltage $V_{DD}$. Therefore, coupling capacitors (not shown) may be implemented between boost stages 620 and 630, and gain stages 640 and 660, to increase the voltage headroom for amplification, for example, by attenuating or removing DC components of the input signals.

Figure 13:
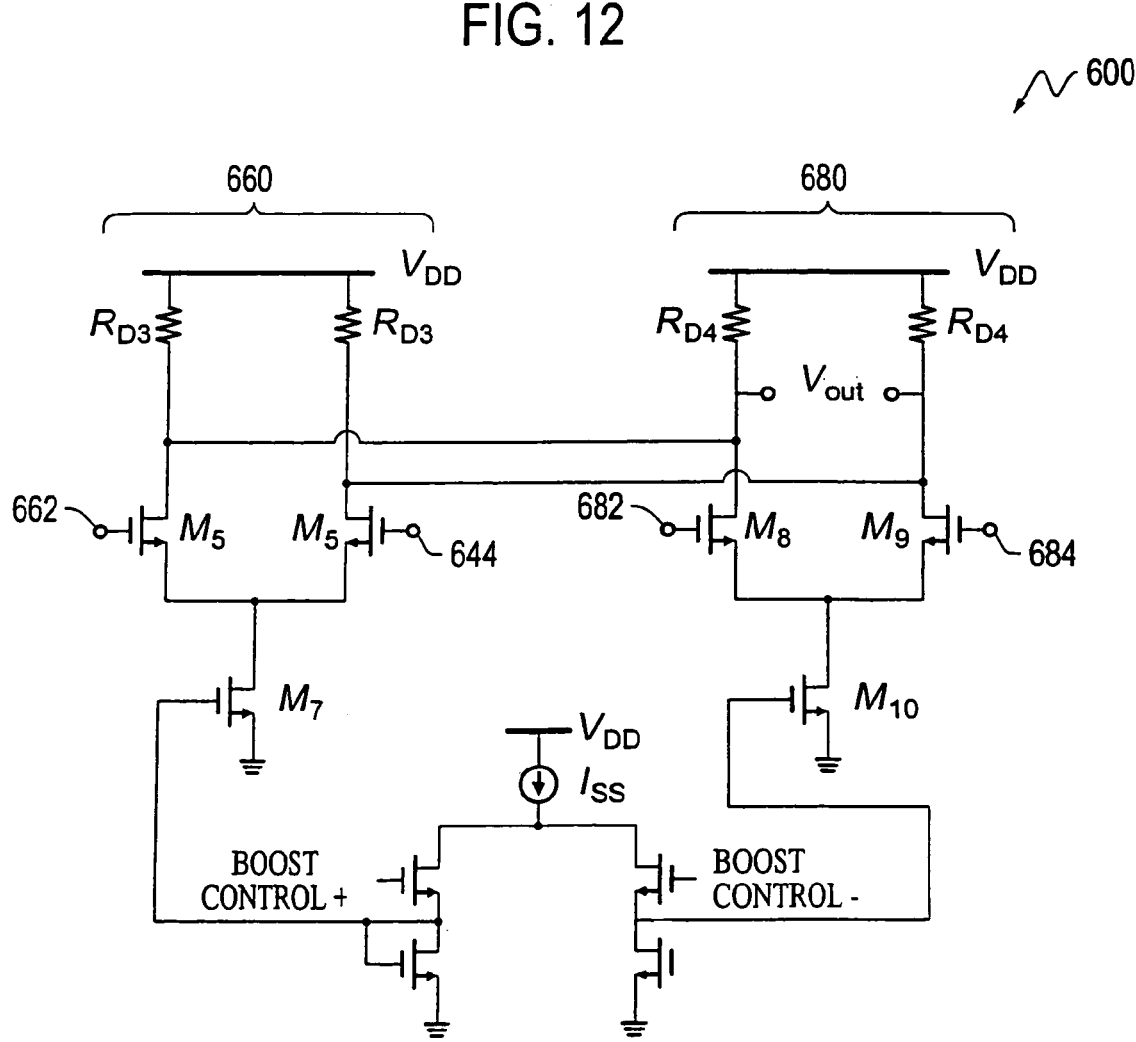
FIG. 13 shows further detail of the gain stages of the equalizer shown in FIG. 9.

FIG. 13 is an exemplary circuit diagram of amplification stages 660 and 680. According to FIG. 13, the outputs of amplifiers 660 and 680 may be coupled together to form an output signal $V_{out}$. FIG. 13 shows additional details of gain stages 660 and 680, and the circuitry which couples their output. Amplifier 660 may be similar to amplifier 640, shown in FIG. 12. However, amplifier 660 lacks the inductor $L_2$ of amplifier 640, which may reduce the area required for amplifier 660 at a cost of reduced bandwidth. Accordingly, there may be little or no phase shift associated with gain stage 660, and the gain applied by gain stage 660 may be frequency-independent.

The differential input signal to amplifier 660 may be input to nodes 662 and 664 from output nodes 646 and 648 of the previous gain stage shown in FIG. 10. The differential input signal to amplifier 680 may be input to nodes 682 and 684 from the output of passive stage 610 of FIG. 9. The differential output signal may be taken from the $V_{out}$ nodes indicated in FIG. 13.

Changing the value of positive boost control relative to negative boost control may change the influence of M7 relative to the influence of M10, by increasing the gate voltage of M7 relative to the gate voltage of M10. The gate voltage of M7 relative to M10 may determine the current through amplifier 660 relative to the current through amplifier 680. However, in this configuration, the total amount of bias current flowing in the two amplifiers may be fixed. In the extreme case of boosting the output of a long trace or channel, which may impose a relatively large amount of high frequency loss, most or all of the bias current may flow through high frequency amplification path with high frequency amplifier 660, and the all-pass path with amplifier 680 may be essentially shut off. In the other extreme in which there is no high frequency boosting at all, most or all of the current may flow through the all-pass path with amplifier 680, and high frequency path with high frequency amplifier 660 may be essentially shut off. In intermediate situations, the current may be distributed depending on the peaking requirements of the equalizer filter. This boost control may therefore provide a wide range of peaking response from the equalizer.

The relative gain applied by high frequency path with high frequency amplifier 660 compared all-pass path with amplifier 680 may be adjusted using the boost control, based on desired attributes of the equalized signal, or based on an error rate as detected by the clock and data recovery circuit 30 in FIG. 1. The adjustment of the relative gain of high frequency path with high frequency amplifier 660 compared to the all-pass path with amplifier 680 may be adjusted to minimize the error rate measured by clock and data recovery circuit 30.

The boosting stages and gain stages of the equalizer shown in FIGS. 9-13 may provide 20 dB of peaking at 5 GHz with good linearity and little noise accumulation in the stages.

Figure 14:
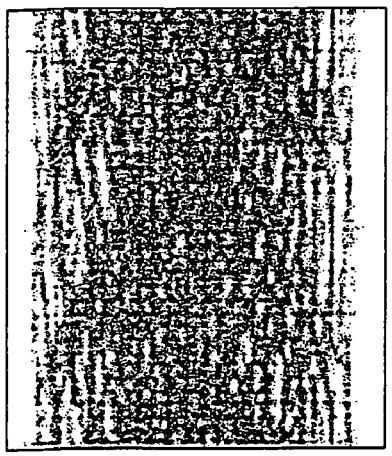
FIGS. 14-17 show signals before and after equalization by the equalizer shown in FIG. 9.
Figure 15:
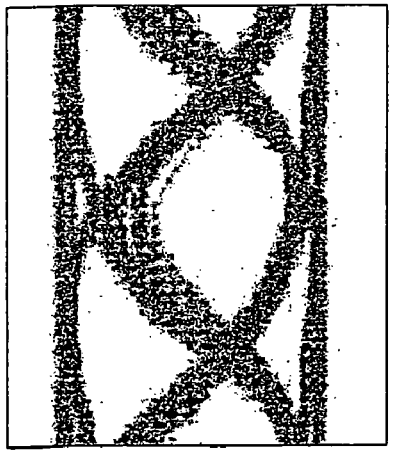
Figure 16:
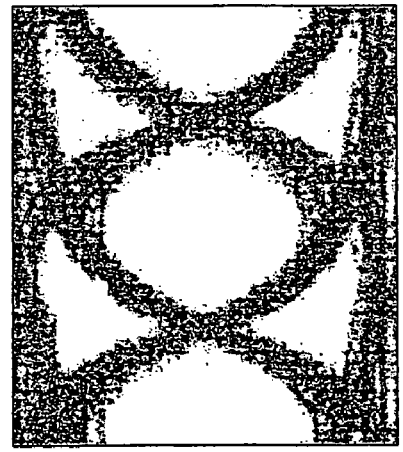

FIGS. 14-17 show experimental results of an equalizer using reverse scaling on a signal having a maximum data rate of 10 Gb/sec. The supply voltage for FIGS. 14-17 was 1.2V. FIG. 14 shows the 10 Gb/sec signal at the output of a 30 inch channel, and FIG. 16 shows the 10 Gb/sec signal at the output of a 6 inch channel. The channel were fabricated using Flame Retardent 4 (FR 4), a fiberglass material in widespread use in constructing printed circuit boards. As shown in FIGS. 14 and 16, the 30 inch channel may significantly attenuate the high frequency attributes of the signal, leading to severe intersymbol interference, and the 6 inch channel may similarly attenuate the high frequency attributes, although less severely. The signal shown in FIG. 14, if put into a clock recovery circuit, may result in significant phase jitter of the clock.

Figure 17:
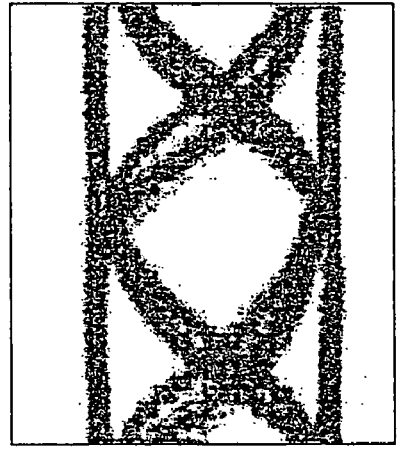

FIGS. 15 and 17 show the signal from FIGS. 14 and 16, respectively, after equalization in an equalizer using reverse scaling, such as that shown in FIG. 4. As shown in FIGS. 15 and 17, the high frequency characteristics of the signal may be largely restored by the equalizer, leading to much improved bit error rate performance at the data detector.

Table 1 summarizes some experimental performance results of the equalizer 600 shown in FIGS. 9-13.

TABLE 1

| Parameter | Value |
| --- | --- |
| Max data rate | 10 Gb/sec |
| High frequency adaptation | Yes |
| Low frequency adaptation | Yes |
| Loss compensated | 20 dB @ 5 GHz |
| RMS noise | <9 mV$_{rms}$ |
| Power supply | 1.2 V |
| Power dissipation | 17 mW |
| Die area | 450 μm × 360 μm |
| Technology | 0.13 μm CMOS |

While details are described in conjunction with the examples outlined above, it is evident that many alternatives, modifications and variations are possible. For example, the passive input circuit, the parallel path approach in implementing the equalizer filter, i.e., the high frequency amplification path and the all-pass path, the relative tuning or adjustment of these paths, and high and low frequency gain loops described herein are applicable to analog as well as digital equalizers. In addition, the components shown for the various boost and gain stages are exemplary only, and various changes may be made to the detailed circuit configurations shown. Accordingly, the exemplary implementations as set forth above are intended to be illustrative, not limiting.

What is claimed is:

1. An equalizer, comprising:
   at least one passive input boost stage including only passive components that determine an RC time constant of the input boost stage, the passive input boost stage acts as a filter with a high frequency boost; and
   a plurality of gain stages disposed in parallel with each other, the plurality including at least one gain stage in a high frequency amplification path that follows the at least one passive input boost stage including only passive components, and at least one gain stage in an all-pass path,
   wherein the high frequency amplification path further includes at least one boost stage that boosts high frequency components.

2. The equalizer of claim 1, wherein the at least one gain stage in the high frequency amplification path and the at least one gain stage in the all-pass path are coupled together such that a combined bias current for both gain stages is fixed.

3. The equalizer of claim 2, further comprising a boost control signal that determines a relative amount of bias current flowing through the at least one gain stage in the high frequency amplification path compared to the amount of current flowing through the at least one gain stage in the all-pass path.

4. The equalizer of claim 1, wherein the at least one gain stage in the high frequency amplification path and the at least one gain stage in the all-pass path each further comprises at least two input transistors.

5. The equalizer of claim 1, wherein the at least one boost stage in the high frequency amplification path includes at least one active boost stage with active components.

6. The equalizer of claim 5, wherein the active boost stage includes at least two input transistors, and three passive components which determine a frequency response of the boost stage.

7. The equalizer of claim 5, wherein the active boost stage includes at least three transistors, one of which functions as a variable resistor and two others of which function as varactors.

8. The equalizer of claim 1, wherein the at least one passive input boost stage including only passive components includes at least one resistor and at least one capacitor, configured as the filter.

9. The equalizer of claim 8, wherein the at least one resistor comprises two resistors, configured as a voltage dividing circuit.

10. The equalizer of claim 9, wherein the at least one capacitor comprises two capacitors, each arranged in parallel with a corresponding one of the two resistors.

11. The equalizer of claim 1, wherein the at least one gain stage of the all-pass path amplifies a signal taken before the at least one passive input boost stage including only passive components, and adds the amplified signal to an output of the gain stage in the high frequency amplification path.

12. The equalizer of claim 11, wherein the at least one boost stage in the high frequency amplification path includes at least one active boost stage with active components.

13. An equalizer, comprising:
    at least one passive input boost stage including only passive components that determine an RC time constant of the input boost stage, the passive input boost stage acts as a filter with a high frequency boost; and
    a plurality of gain stages disposed in parallel with each other, the plurality including at least one gain stage in a high frequency amplification path that follows the at least one passive input boost stage including only passive components, and at least one gain stage in an all-pass path,
    wherein:
    the high frequency amplification path further includes at least one boost stage that boosts high frequency components; and
    the at least one gain stage in the all-pass path amplifies a signal taken after the at least one passive input boost stage including only passive components, and adds the amplified signal to an output of the high frequency amplification path.

14. The equalizer of claim 13, wherein the at least one boost stage in the high frequency amplification path includes at least one active boost stage with active components.

15. A method for equalizing a signal from a channel, comprising:
    boosting a differential input signal with an input boost stage including only passive components, the input boost stage acts as a filter with a high frequency boost;

amplifying an output of the input boost stage with a gain stage in an all-pass path;

boosting high frequency components of the output of the input boosting stage with a high frequency boost stage including active components;

amplifying an output of the high frequency boost stage including active components with a gain stage in a high frequency path; and combining an output of the gain stage in the high frequency path with an output of the gain stage in the all-pass path to generate the equalized signal.

16. The method of claim 15, further comprising:

adjusting an amount of gain applied by the gain stage in the all-pass path relative to the gain stage in the high frequency path, based on desired attributes of the equalized signal.

17. The method of claim 15, further comprising: adjusting a frequency response of the high frequency boost stage.

18. The method of claim 17, wherein adjusting the frequency response of the high frequency boost stage further comprises adjusting a voltage on a gate terminal of one transistor and on a source terminal and drain terminal of another transistor.

19. The method of claim 15, further comprising:

deriving a clock frequency from the equalized signal.

20. The method of claim 19, further comprising:

detecting transmitted data occurring at the clock frequency in the equalized signal.

21. The method of claim 20, further comprising: adjusting an amount of gain applied by the gain stage in the all-pass path relative to an amount of gain applied by the gain stage in the high frequency path, to reduce an error rate in the detected data.

* * * * *